United States Patent
Le et al.

(10) Patent No.: US 10,834,201 B2
(45) Date of Patent: Nov. 10, 2020

(54) DEVICE IDENTIFICATION AND RECONFIGURATION IN A NETWORK

(71) Applicant: International Business Machines Corporation, Armonk, NY (US)

(72) Inventors: Thai Franck Le, White Plains, NY (US); Dinesh C. Verma, New Castle, NY (US); Dilip Dinkar Kandlur, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 24 days.

(21) Appl. No.: 16/201,683

(22) Filed: Nov. 27, 2018

(65) Prior Publication Data
US 2020/0169528 A1   May 28, 2020

(51) Int. Cl.
*G06F 11/30* (2006.01)
*H04L 12/24* (2006.01)
(Continued)

(52) U.S. Cl.
CPC ............ *H04L 67/125* (2013.01); *G06F 11/30* (2013.01); *G06F 11/3006* (2013.01);
(Continued)

(58) Field of Classification Search
CPC ......... H04L 29/00; H04L 29/02; H04L 41/00; H04L 41/08–0806; H04L 41/0813; H04L 41/082–0836; H04L 41/0876; H04L 41/0886; H04L 43/00; H04L 43/08; H04L 43/0817; H04L 61/00; H04L 61/1511; H04L 63/00; H04L 63/10; H04L 63/101; H04L 67/00; H04L 67/12; H04L 67/125; G06F 11/00; G06F 11/30; G06F 11/3006
See application file for complete search history.

(56) References Cited

U.S. PATENT DOCUMENTS 7,467,214 B2 * 12/2008 Chin ................... H04L 12/1836
709/230
7,620,733 B1 * 11/2009 Tzakikario .......... H04L 61/1511
709/245

(Continued)

OTHER PUBLICATIONS

Guo Hang et al., IP-Based IoT Device Detection, Proceedings of the 2018 Workshop on IoT Security and Privacy, Abstract, p. 1,2&6, ACM Digital Library.

*Primary Examiner* — Gil H. Lee
*Assistant Examiner* — Boris D Grijalva Lobos
(74) *Attorney, Agent, or Firm* — Garg Law Firm, PLLC; Rakesh Garg; Joseph Petrokaitis (57) ABSTRACT

In an embodiment, a method includes detecting a set of domain name system (DNS) requests from a device in an Internet of Things (IoT) network. In an embodiment, a method includes identifying a set of identification information associated with the set of DNS requests. In an embodiment, a method includes predicting, based on the set of identification information, a device type of the device. In an embodiment, a method includes determining, in response to predicting the device type, a network configuration setting for the device type. In an embodiment, a method includes reconfiguring, in response to determining a network configuration setting, a network configuration of the device.

20 Claims, 6 Drawing Sheets

(51) Int. Cl.
*H04L 12/26* (2006.01)
*H04L 29/06* (2006.01)
*H04L 29/08* (2006.01)
*H04L 29/12* (2006.01)

(52) U.S. Cl.
CPC ...... *H04L 41/0813* (2013.01); *H04L 43/0817* (2013.01); *H04L 61/1511* (2013.01); *H04L 63/101* (2013.01)

(56) References Cited

U.S. PATENT DOCUMENTS

| | | | | |
|---|---|---|---|---|
| 8,072,322 B1* | 12/2011 | Howard | ................ | G08B 25/14 340/504 |
| 8,108,666 B2* | 1/2012 | Baskey | ................ | H04L 67/306 713/100 |
| 8,612,556 B2* | 12/2013 | Durand | ............ | H04L 29/12066 709/220 |
| 9,712,484 B1* | 7/2017 | Richardson | ......... | H04L 67/2842 |
| 9,854,057 B2 | 12/2017 | Chari | ................ | H04L 67/303 |
| 10,122,630 B1* | 11/2018 | Koenning | ............ | H04L 45/745 |
| 10,164,989 B2* | 12/2018 | Paugh | ............... | G06F 16/90335 |
| 10,205,702 B1* | 2/2019 | Akef | ..................... | H04L 61/605 |
| 2004/0017393 A1* | 1/2004 | Easwar | ............... | G06F 16/9577 715/744 |
| 2010/0121981 A1* | 5/2010 | Drako | ................ | H04L 61/1511 709/245 |
| 2011/0119306 A1* | 5/2011 | Patil | ................ | H04L 29/12066 707/783 |
| 2011/0258249 A1* | 10/2011 | Biggs | ...................... | G06F 8/60 709/203 |
| 2011/0271005 A1* | 11/2011 | Bharrat | ............... | H04L 61/1511 709/232 |
| 2012/0324254 A1* | 12/2012 | Venkatavaradhan | ... | G06F 1/266 713/310 |
| 2015/0326594 A1* | 11/2015 | Chari | .................... | H04L 67/303 726/23 |
| 2016/0057614 A1* | 2/2016 | Holcman | ................ | H04W 8/24 455/414.1 |
| 2016/0254995 A1* | 9/2016 | Wang | ..................... | H04L 45/54 370/392 |
| 2016/0337181 A1 | 11/2016 | Cathrow et al. | | |
| 2016/0381161 A1* | 12/2016 | Matsumura | ......... | H04L 12/6418 709/225 |
| 2017/0052962 A1* | 2/2017 | Chan | ............... | H04N 21/26283 |
| 2017/0156018 A1* | 6/2017 | Li | .......................... | H04W 8/22 |
| 2017/0180380 A1* | 6/2017 | Bagasra | ............... | H04L 63/101 |
| 2017/0257341 A1* | 9/2017 | Arsenault | ............... | H04W 4/70 |
| 2018/0020355 A1* | 1/2018 | Targali | .................... | H04L 63/20 |
| 2018/0026935 A1* | 1/2018 | Ripke | ................ | H04L 61/1511 709/213 |
| 2018/0048542 A1* | 2/2018 | Still | .................... | H04L 43/0811 |
| 2018/0070226 A1 | 3/2018 | Raman et al. | | |
| 2018/0219912 A1* | 8/2018 | Maslak | ............... | H04L 63/1441 |
| 2019/0098058 A1* | 3/2019 | Ikegami | ............... | H04L 63/102 |
| 2019/0125361 A1* | 5/2019 | Shelton, IV | ....... | A61B 17/0206 |
| 2019/0190931 A1* | 6/2019 | Levin | ................... | H04L 63/101 |
| 2019/0349320 A1* | 11/2019 | Karuppusamy | ....... | G06F 40/263 |

\* cited by examiner

DEVICE IDENTIFICATION AND RECONFIGURATION IN A NETWORK

TECHNICAL FIELD

The present invention relates generally to a method, system, and computer program product for providing security measures for devices. More particularly, the present invention relates to a method, system, and computer program product for device identification and reconfiguration in a network.

BACKGROUND

Internet of Things (IoT) is essentially a network of a variety of devices, which through embedded sensors, other hardware, and software are able to communicate with each other over a data communication infrastructure according to a standard or specification. It is contemplated within IoT that devices such as refrigerators, thermostats, lighting appliances, vending machines, access-control devices, peripherals, and many other devices in everyday use (collectively referred to hereinafter as "device" or "devices"), will be able to communicate and interoperate with each other using such an infrastructure.

Each device in the IoT implements the necessary components to interoperate on the specified IoT infrastructure. It is very likely, and perhaps even desirable that many devices be available in the IoT to offer the same or similar services, or to offer a particular use to a user. Devices providing the same or similar services often share common programming.

The illustrative embodiments recognize that common devices in a network pose security risks. The illustrative embodiments further recognize certain disadvantages of presently available methods for device identification in a network. For example, presently available methods commonly match a media access control (MAC) address of a device with an organizationally unique identifier (OUI). Vendors can purchase a unique OUI which is then used as the prefix of identifiers, such as a MAC address, to uniquely identify the vendor's equipment. However, the retrieved vendor often does not correspond to the network device but instead to a network card used by the device. Furthermore, the OUI only returns the name of the device vendor. Device vendors commonly manufacture a large range of products, including many different device types. As a result, use of GUIs does not allow for identification of a particular device type or a specific device from a device vendor.

SUMMARY

The illustrative embodiments provide a method, system, and computer program product for device identification and reconfiguration in a network.

In an embodiment, a method includes detecting a set of domain name system (DNS) requests from a device in an Internet of Things (IoT) network. In an embodiment, a method includes identifying a set of identification information associated with the set of DNS requests. In an embodiment, a method includes predicting, based on the set of identification information, a device type of the device.

In an embodiment, a method includes determining, in response to predicting the device type, a network configuration setting for the device type. In an embodiment, a method includes reconfiguring, in response to determining a network configuration setting, a network configuration of the device.

In an embodiment, predicting a device type of the device further includes comparing the set of DNS requests with a second set of DNS requests. In an embodiment, a method includes filtering the set of DNS requests to produce a subset of the set of DNS requests. In an embodiment, a method includes monitoring a frequency of a subset of the set of DNS requests.

In an embodiment, identifying a set of identification information further includes associating a domain name with at least one DNS request of the set of DNS requests. In an embodiment, a method includes weighting, using a weighting rule, a subset of the set of DNS requests. In an embodiment, reconfiguring further includes removing the device from the IoT network.

In an embodiment, reconfiguring further includes modifying a set of access rules for the device. In an embodiment, reconfiguring further includes redirecting network traffic from the device.

An embodiment includes a computer usable program product. The computer usable program product includes a computer-readable storage device, and program instructions stored on the storage device.

In an embodiment, the computer usable code is stored in a computer readable storage device in a data processing system, and wherein the computer usable code is transferred over a network from a remote data processing system. In an embodiment, the computer usable code is stored in a computer readable storage device in a server data processing system, and wherein the computer usable code is downloaded over a network to a remote data processing system for use in a computer readable storage device associated with the remote data processing system An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The example devices and network infrastructures used or described herein are not intended to be limiting on the illustrative embodiments. From this disclosure, those of ordinary skill in the art will be able to adapt an embodiment for use with other types of network devices, in other types of network environments or infrastructures, and the same are contemplated within the scope of the illustrative embodiments.

The illustrative embodiments recognize that as a result of common programming, a hacker gaining access to a single device can apply the same technique to gain access to same or similar devices within the network. For example, a hacker gains access to a network device, gets command codes, and executes commands remotely. For example, a hacker may gain access to a network device such as a camera. The hacker may gain access to the camera to monitor users and retrieve personal information about the users. The hacker may then apply the same process to gain access to other cameras to retrieve additional personal information or another similar purpose. The illustrative embodiments recognize that the same technique the hacker used to gain access to the network device can also be used on similar devices within the network environment.

The illustrative embodiments used to describe the invention generally address and solve the above-described problems and other problems related to device identification and reconfiguration in a network environment. The illustrative embodiments provide a method, system, and computer program product for device identification and reconfiguration in a network environment.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description.

The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
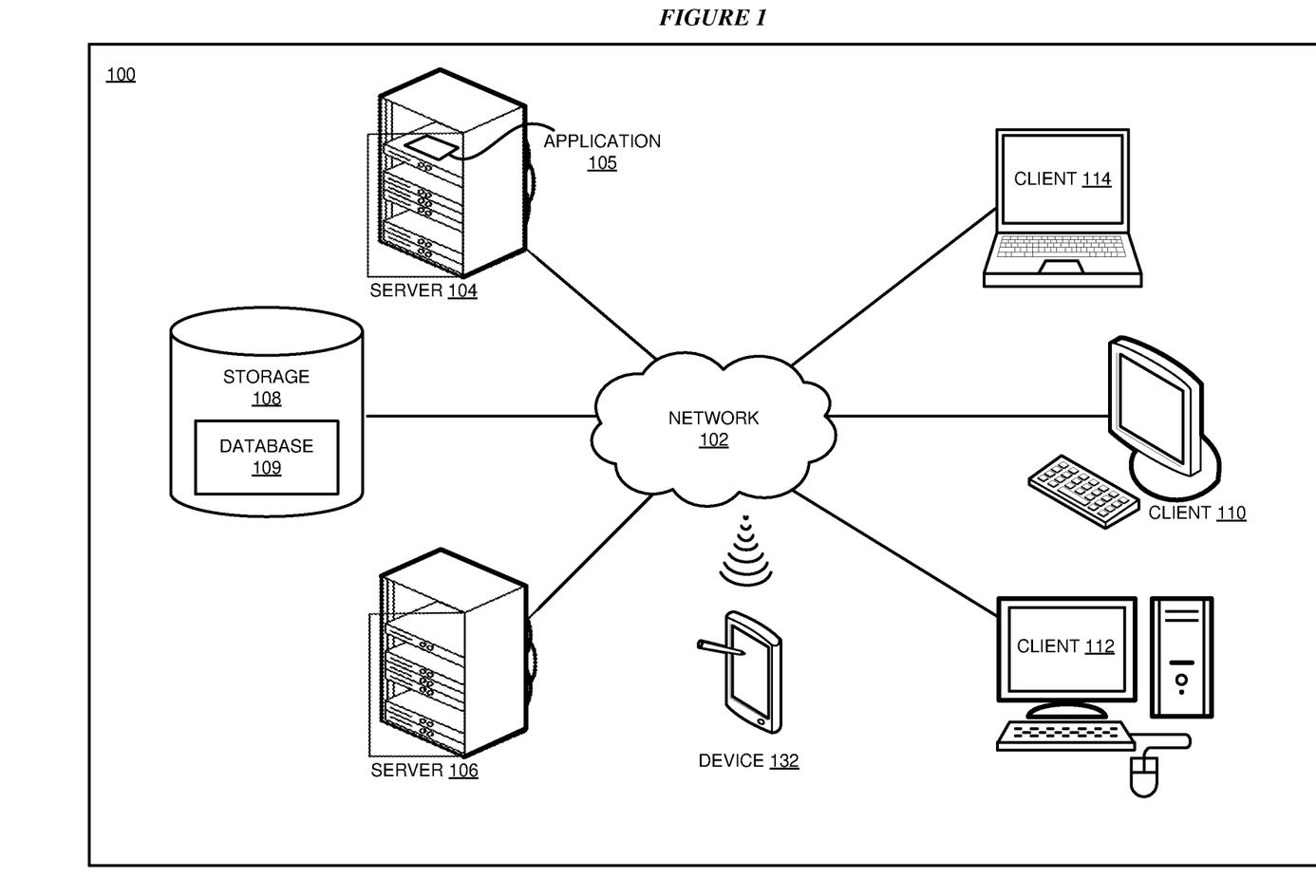
FIG. 1 depicts a block diagram of a network of data processing systems in which illustrative embodiments may be implemented.
Figure 2:
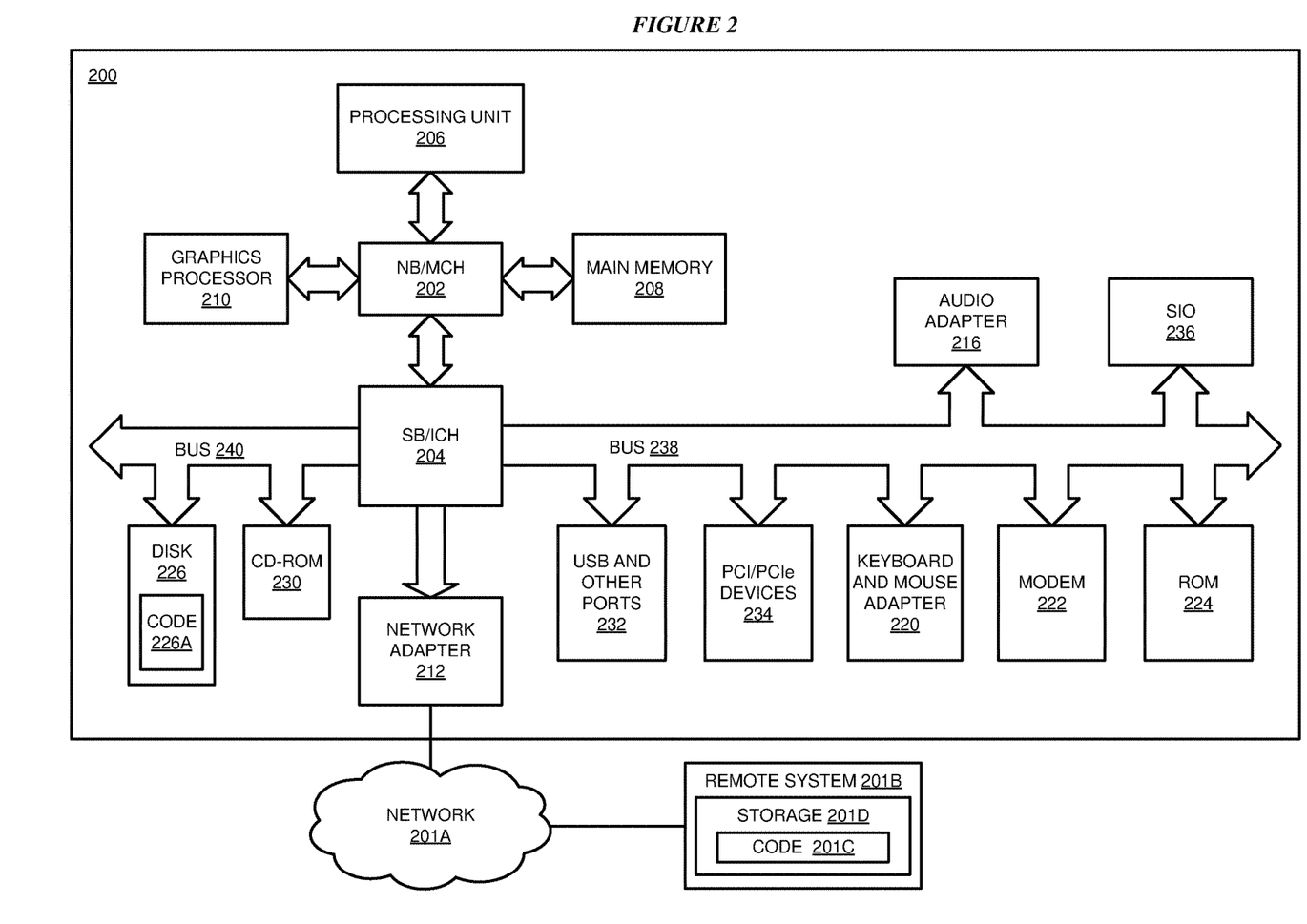
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a camera, a digital media player, a weather station, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 implements a remotely usable function (remote) of an embodiment described herein. Application 105 performs DNS domain retrieval, device type retrieval, DNS request monitoring, DNS request filtering, predict device types, network device configuration, other operations described herein, or some combination thereof.

Application 105 performs a device identification and configuration process. Application 105 monitors DNS requests from devices in the network, filters the DNS requests, identifies owners of DNS domains associated with the requests, identifies device types based on DNS requests, and configures network access for devices.

Servers 104 and 106, storage unit 108, and clients 110, 112, and 114, and devices 132, 136 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as devices 132, 136 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
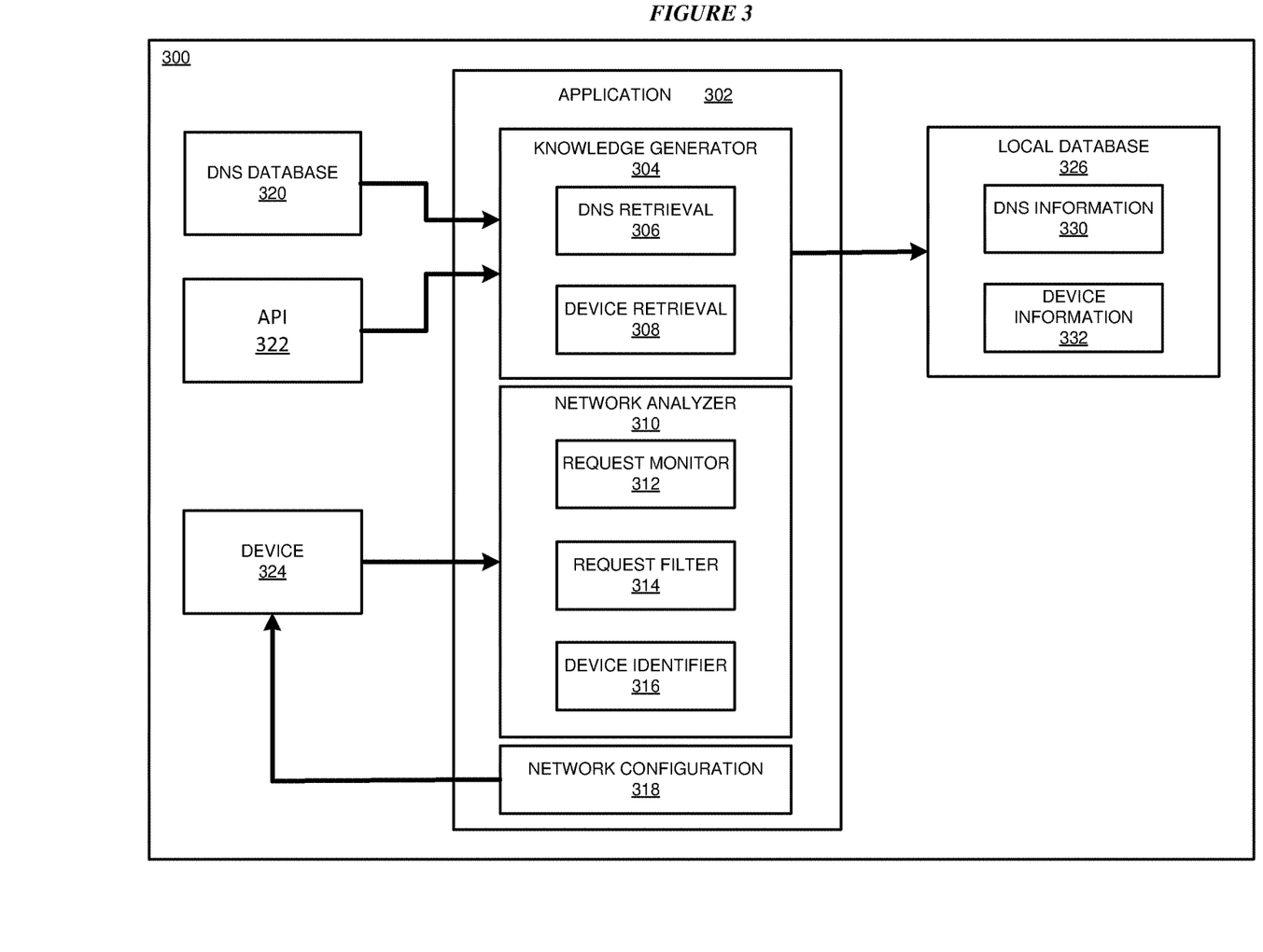
FIG. 3 depicts a block diagram of an example configuration for device identification and reconfiguration in a network.

With reference to FIG. 3, this figure depicts a block diagram of an example configuration 300 for device identification and reconfiguration in a network. The example embodiment includes an application 302. In a particular embodiment, application 302 is an example of application 105 of FIG. 1.

Application 302 includes a knowledge generator component 304, a network analyzer component 310, and a network configuration component 318. In an embodiment, knowledge generator component 304 includes a DNS retrieval component 306 and a device retrieval component 308. In an embodiment, DNS retrieval component 306 extracts a set of identification information (e.g., domain owner) of a set of DNS domains, and infers the manufacturer of the device. For example, component 306 can access public DNS database 320 containing resource records for a domain. The public DNS database 320 links domain names to a specific IP address. In an embodiment, device retrieval component 308 retrieves a set of device types from a vendor manufacturer. For example, component 308 can retrieve all devices from a vendor manufacturer through API 322. Component 308 extracts device types from each retrieved device. In an embodiment, component 308 records a set of DNS identification information and device information in a local database 326. In an embodiment, local database 326 stores extracted DNS information 330 and extracted device information 332.

Application 302 monitors a set of requests from at least one device in a network. In an embodiment, the set of requests are a set of DNS requests. Device 324 is an example of device 132 in FIG. 1. Device 324 transmits a set of DNS requests. The set of requests may be directed to application 302, detected by application 302, intercepted by application 302, or redirected to application 302. In an embodiment, component 306 extracts identification information for each of the set of DNS requests.

In an embodiment, network analyzer component 310 includes a request monitor component 312, a request filter component 314, and a device identifier component 316. Component 312 captures traffic on a network, such as network 102 in FIG. 1. In an embodiment, component 312 monitors a set of DNS requests. In an embodiment, component 312 monitors the identification information in each DNS request of the set of DNS requests. For example, component 312 can determine the domain name associated with each DNS request of the set of DNS requests. As another example, component 312 can determine an owner of the domain name for each DNS request. In an embodiment, component 312 monitors an access frequency for the identification information in each DNS request of the set of DNS requests. For example, component 312 can increment a counter for each instance a domain name is requested in the set of DNS requests.

Component 314 filters the set of DNS requests based on a filter criterion. In an embodiment, component 314 filters out DNS requests to common resources, such as Network Time Protocol (NTP). In an embodiment, component 314 filters out DNS requests based on a time period. In an embodiment, component 314 weights the set of DNS requests based on a weighting rule. For example, component 314 can filter the set of DNS requests into a series of subsets, each subset corresponding to a different domain name. In an embodiment, component 314 weights the subsets according to an access frequency for the associated domain name.

In an embodiment, component 316 identifies a device manufacturer for the device 324. For example, component 316 can determine the domain name with the greatest access frequency corresponds to the device manufacturer. As another example, component 316 can determine the domain name from a filtered subset of the set of DNS requests with the highest access frequency corresponds to the device manufacturer.

In an embodiment, component 316 identifies a device type for the device 324. In an embodiment, component 316 analyzes a set of DNS requests from the unidentified device. For example, component 316 can convert the set of DNS requests over a time period to a document. In an embodiment, component 316 generates a vector from the document, the vector representing the set of DNS requests. In an embodiment, component 316 compares the generated vector with a set of vectors generated from different device types but from the same device manufacturer. Each vector of the set of vectors corresponds to a device produced by the device manufacturer. For example, component 316 can compute a cosine similarity between the generated vector and each of the set of vectors. In an embodiment, component 316 returns the device name associated with the corresponding vector with the greatest similarity to the generated vector, and as such, can identify the device type.

In an embodiment, component 318 reconfigures a network configuration of a device type of the identified device. For example, component 318 analyzes a set of security policies associated with a device type for the network. Component 318 determines the identified device is in violation of at least one of the set of security policies. For example, component 318 can determine a camera device type should not be allowed access to the network. As another example, component 318 can determine a digital media player device type should have a bandwidth or download speed limited. In an embodiment, component 318 creates an access control list for each device identified in the network. In an embodiment, component 318 creates and maintains a network configuration setting for each identified device in the access control list. For example, component 318 can block the MAC address for an identified camera in the network.

Figure 4:
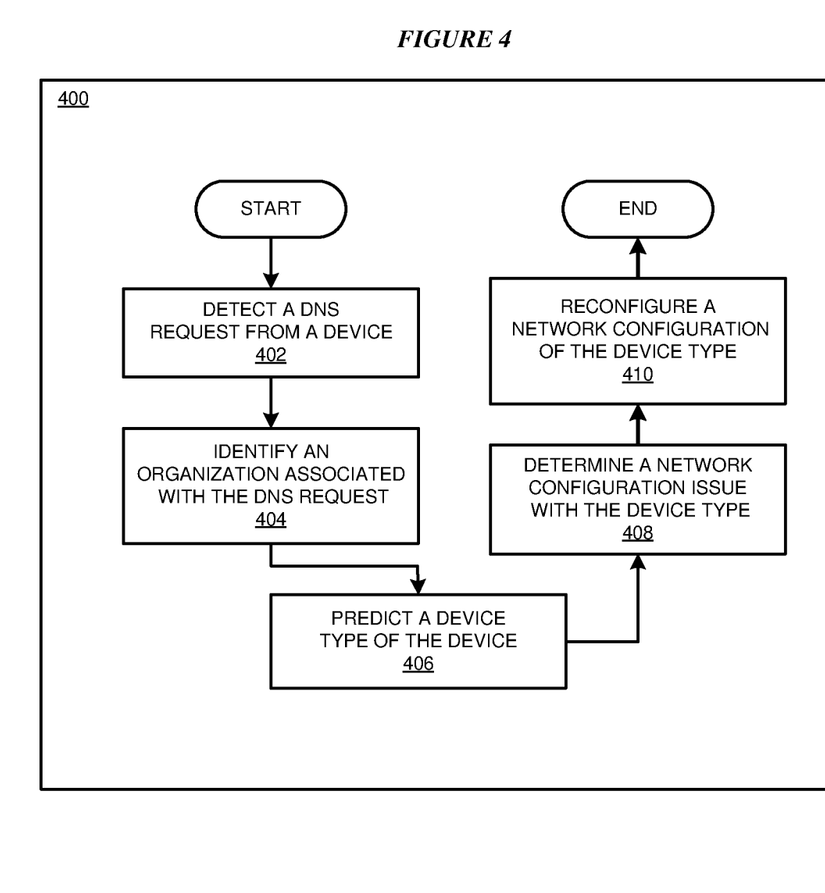
FIG. 4 depicts a flowchart of an example process for device identification and reconfiguration in an IoT environment in accordance with an illustrative embodiment.

With reference to FIG. 4, this figure depicts a flowchart of an example process 400 for device identification and reconfiguration in an IoT environment in accordance with an illustrative embodiment. Process 400 can be implemented in application 105 within the scope of the illustrative embodiments.

In block 402, application 105 detects a DNS request from a device, such as device 132 in FIG. 1. In block 404, application 105 identifies an organization (owner) associated with the DNS request. In an embodiment, application 105 queries a database, such as database 326 in FIG. 3, for the organization associated with the DNS request.

In block 406, application 105 predicts a device type of the device. From the organization identified in block 404, the application infers the manufacturer of the device. In an embodiment, the manufacturer is inferred after observing a set of DNS requests submitted over a configurable time interval (e.g., over one hour time interval, or 24 hour time intervals). After identifying the manufacturer, the application infers the type of the device (e.g., camera, digital media player). In an embodiment, the application converts a set of DNS requests submitted by the device over a configurable time interval. For example, the application can convert the set of DNS requests into a vector.

In an embodiment, the application compares the generated vector with generated vectors from known devices from the same manufacturer. For example, the application can compute a cosine similarity between the generated vector and each of the set of vectors of known devices. In an embodiment, the application selects a vector from the set of vectors with the closest similarity to the generated vector. In an embodiment, the application returns the device type of the selected vector.

In an embodiment, application 105 predicts a device type of the device based on the owner associated with the DNS request. For example, if application 105 determines the owner associated with the DNS request is a camera manufacturer, application 105 can predict the device type is a camera. As another example, application 105 can predict the device type is a model of camera produced by the camera manufacturer. In block 408, application 105 determines a network configuration setting (issue) for the device type. In an embodiment, application 105 determines a set of network policies for the device type. For example, application 105 can determine cameras are not permitted network access. In block 410, application 105 reconfigures a network configuration of the device type. For example, application 105 can remove the device from the network based on the set of network policies for the device type. As another example, application 105 can quarantine the device type from interacting with other devices on the network based on the set of network policies. As another example, application 105 can redirect network traffic from the device type based on the set of network policies. Application 105 ends process 400 thereafter.

Figure 5:
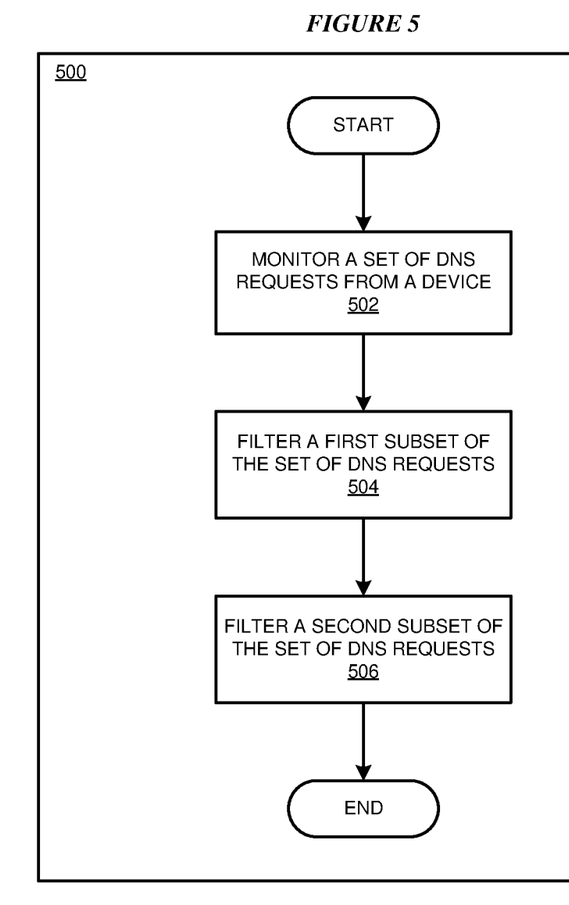
FIG. 5 depicts a flowchart of an example process for monitoring a set of DNS requests from a device in an IoT network in accordance with an illustrative embodiment.

With reference to FIG. 5, this figure depicts a flowchart of an example process 500 for monitoring a set of DNS requests from a device in an IoT network in accordance with an illustrative embodiment. Process 500 can be implemented in application 105 within the scope of the illustrative embodiments.

In block 502, application 105 monitors a set of DNS requests from a device. For example, application 105 can determine a set of identification information for the set of DNS requests. In block 504, application 105 filters a first subset of the set of DNS requests. In an embodiment, application 105 filters the set of DNS requests based on a filter criterion. For example, application 105 can filter the set of DNS requests to remove commonly accessed services.

In block 506, application 105 filters a second subset of the set of DNS requests. For example, application 105 can filter the set of DNS requests based on a second filter criterion. In an embodiment, application 105 filters the set of DNS requests based on an access frequency criterion. Application 105 ends process 500 thereafter.

Figure 6:
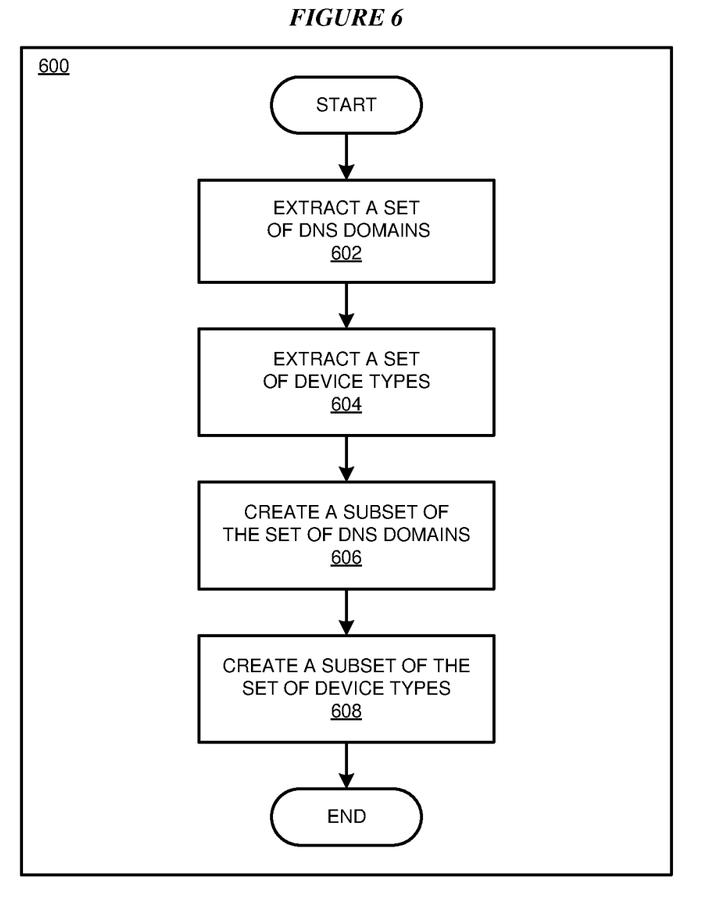
FIG. 6 depicts a flowchart of an example process for generating a database of DNS identification information and device types in accordance with an illustrative embodiment.

With reference to FIG. 6, this figure depicts a flowchart of an example process 600 for generating a database of DNS identification information and device types in accordance with an illustrative embodiment. Process 600 can be implemented in application 105 within the scope of the illustrative embodiments.

In block 602, application 105 extracts a set of identification information for DNS domains. For example, application 105 can extract the owners of DNS domains through a public database. As another example, application 105 can extract the owners of DNS domains from a X.509 certificate.

In block 604, application 105 extracts a set of device types. For example, application 105 can extract a set of device types from a manufacturer through online retail services. As another example, application 105 can extract a set of device types from an advertising product API for a given manufacturer.

In block 606, application 105 creates a subset of the set of identification information. In an embodiment, application 105 filters the set of identification information to produce the subset. For example, application 105 can filter the set of identification information for commonly accessed domains. As another example, application 105 can filter the set of identification information to a subset including only domains owned by device manufacturers.

In block 608, application 105 creates a subset of the set of device types. In an embodiment, application 105 filters the set of device types based on a filter criterion. For example, application 105 can filter the device types based on a vendor. As another example, application 105 can filter the device types based on a service provided by a device type. Application 105 ends process 600 thereafter.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    detecting a set of domain name system (DNS) requests from a device in an Internet of Things (IoT) network;
    identifying a set of identification information associated with the set of DNS requests;
    predicting, based on the set of identification information, a device type of the device, the predicting comprising:
        converting the DNS requests over a time period to a document;
        generating a vector from the document; and
        comparing the vector with a set of vectors, wherein each vector in the set of vectors is generated from a different device type;
    determining, in response to predicting the device type, a network configuration setting for the device type; and
    reconfiguring, in response to determining a network configuration setting, a network configuration of the device.

2. The method of claim 1, wherein the predicting the device type of the device further comprises:
    comparing the set of DNS requests with a second set of DNS requests.

3. The method of claim 1, further comprising:
    filtering the set of DNS requests to produce a subset of the set of DNS requests.

4. The method of claim 1, further comprising:
    monitoring a frequency of a subset of the set of DNS requests.

5. The method of claim 1, wherein the identifying the set of identification information further comprises:
    associating a domain name with at least one DNS request of the set of DNS requests.

6. The method of claim 1, further comprising:
    weighting, using a weighting rule, a subset of the set of DNS requests.

7. The method of claim 1, wherein the reconfiguring further comprises:
    removing the device from the IoT network.

8. The method of claim 1, wherein the reconfiguring further comprises:
    modifying a set of access rules for the device.

9. The method of claim 1, wherein the reconfiguring further comprises:
    redirecting network traffic from the device.

10. The method of claim 1, wherein the method is embodied in a computer program product comprising one or more computer-readable storage devices and computer-readable program instructions which are stored on the one or more computer-readable tangible storage devices and executed by one or more processors.

11. A computer usable program product for providing device specific security measures in an Internet of Things (IoT) environment, the computer program product comprising a computer-readable storage medium, and program instructions stored on the storage medium, the stored program instructions comprising:
    program instructions to detect a set of domain name system (DNS) requests from a device in an Internet of Things (IoT) network;
    program instructions to identify a set of identification information associated with the set of DNS requests;
    program instructions to predict, based on the set of identification information, a device type of the device, the program instructions to predict comprising:
        program instructions to convert the DNS requests over a time period to a document;

program instructions to generate a vector from the document;
program instructions to compare the vector with a set of vectors, wherein each vector in the set of vectors is generated from a different device type;
program instructions to determine, in response to predicting the device type, a network configuration setting for the device type; and
program instructions to reconfigure, in response to determining a network configuration setting, a network configuration of the device.

12. The computer usable program product of claim 11, wherein the program instructions to predict the device type of the device further comprise:
program instructions to compare the set of DNS requests with a second set of DNS requests.

13. The computer usable program product of claim 11, the stored program instructions further comprising:
filtering the set of DNS requests to produce a subset of the set of DNS requests.

14. The computer usable program product of claim 11, the stored program instructions further comprising:
monitoring a frequency of a subset of the set of DNS requests.

15. The computer usable program product of claim 11, the program instructions to identify the set of identification information further comprising:
program instructions to associate a domain name with at least one DNS request of the set of DNS requests.

16. The computer usable program product of claim 11, the stored program instructions further comprising:
program instructions to reconfigure further comprising:
program instructions to remove the device from the IoT network.

17. The computer usable program product of claim 11, the stored program instructions further comprising:
weighting, using a weighting rule, a subset of the set of DNS requests.

18. The computer usable program product of claim 11, wherein the computer usable code is stored in the computer readable storage medium in a data processing system, and wherein the computer usable code is transferred over a network from a remote data processing system.

19. The computer usable program product of claim 11, wherein the computer usable code is stored in the computer readable storage medium in a server data processing system, and wherein the computer usable code is downloaded over a network to a remote data processing system for use in a computer readable storage device associated with the remote data processing system.

20. A computer system for providing device specific security measures in an Internet of Things (IoT) environment, the computer system comprising a processor, a computer-readable memory, and a computer-readable storage device, and program instructions stored on the storage device for execution by the processor via the memory, the stored program instructions comprising:
program instructions to detect a set of domain name system (DNS) requests from a device in an Internet of Things (IoT) network;
program instructions to identify a set of identification information associated with the set of DNS requests;
program instructions to predict, based on the set of identification information, a device type of the device, the program instructions to predict comprising:
program instructions to convert the DNS requests over a time period to a document; program instructions to generate a vector from the document;
program instructions to compare the vector with a set of vectors, wherein each vector in the set of vectors is generated from a different device type;
program instructions to determine, in response to predicting the device type, a network configuration setting for the device type; and
program instructions to reconfigure, in response to determining a network configuration setting, a network configuration of the device.

\* \* \* \* \*